Jan. 27, 1953
J. H. CORSON ET AL
2,627,009
METHOD OF AND APPARATUS FOR WELDING
AND ANNEALING METAL ARTICLES
Filed Oct. 4, 1949
5 Sheets-Sheet 1
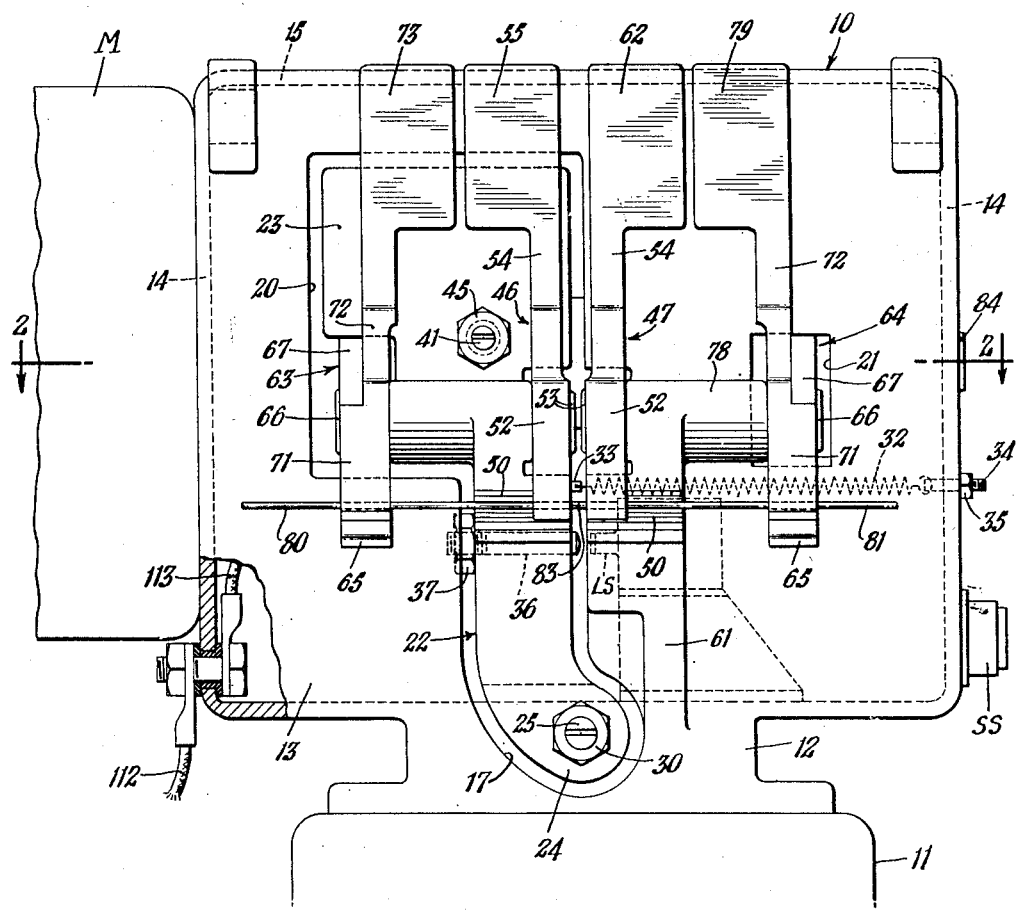
Fig:1.
INVENTORS
JOHN H. CORSON
EDWARD A. SUVERKROP
DARTREY LEWIS
BY
F. J. Pisarra
ATTORNEY

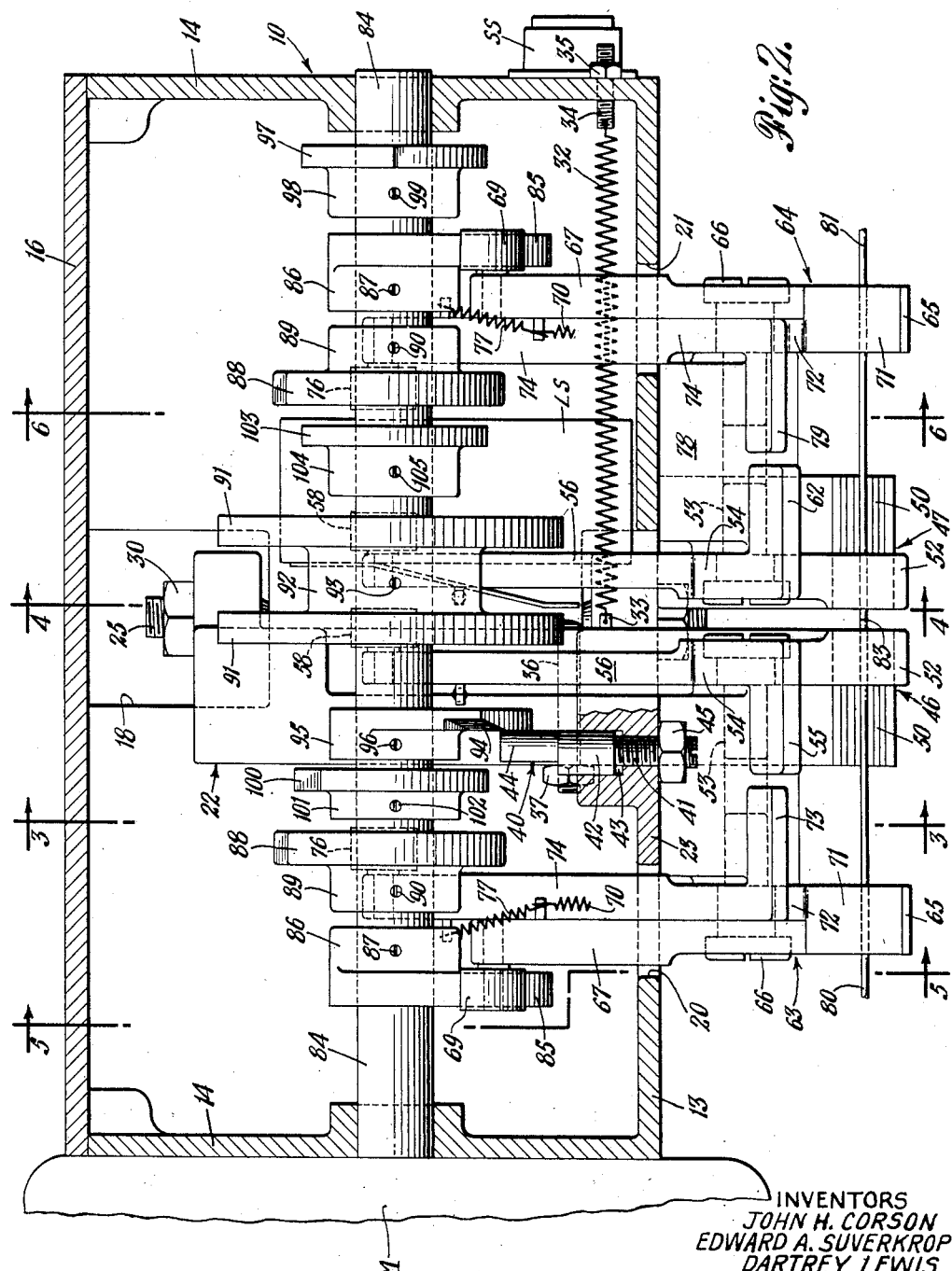

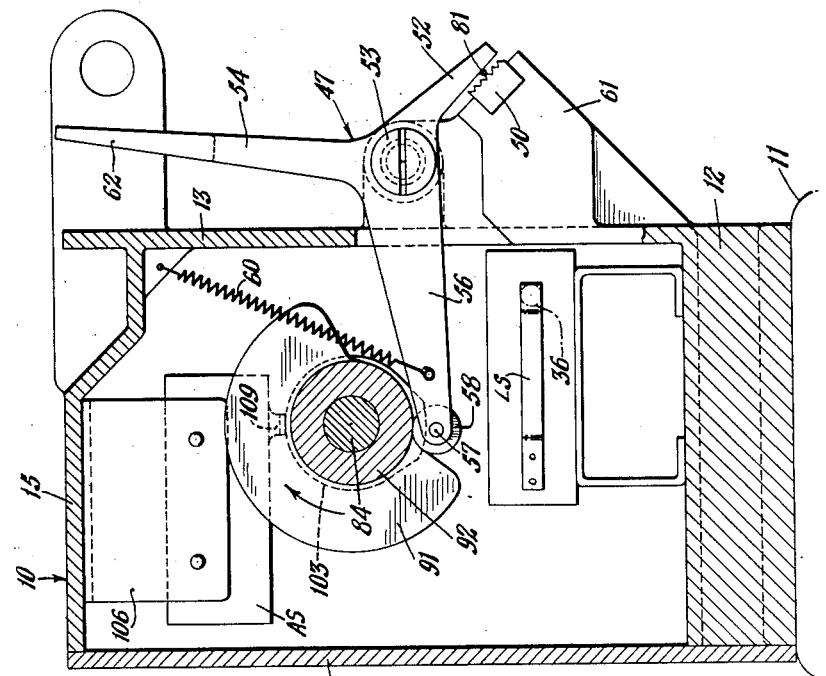

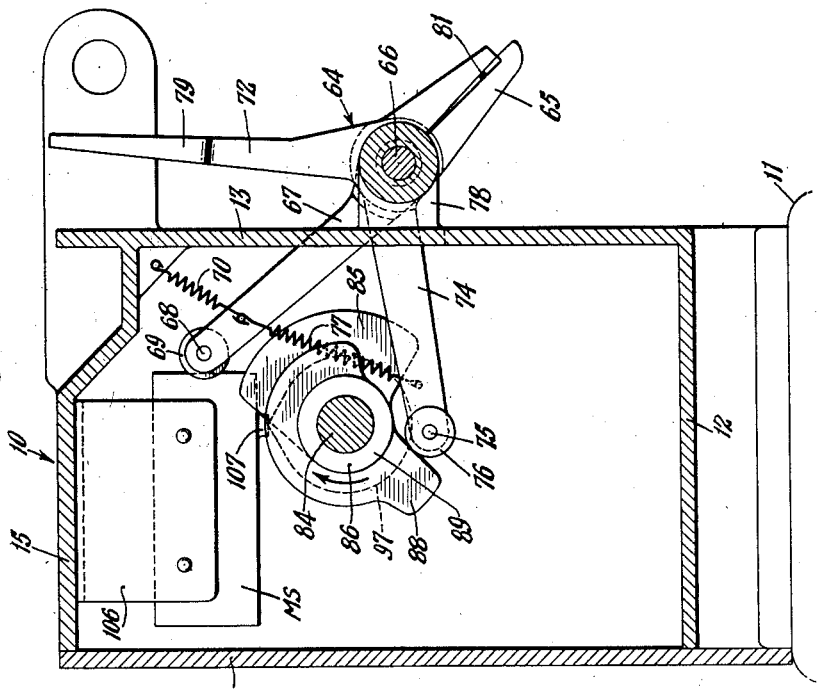
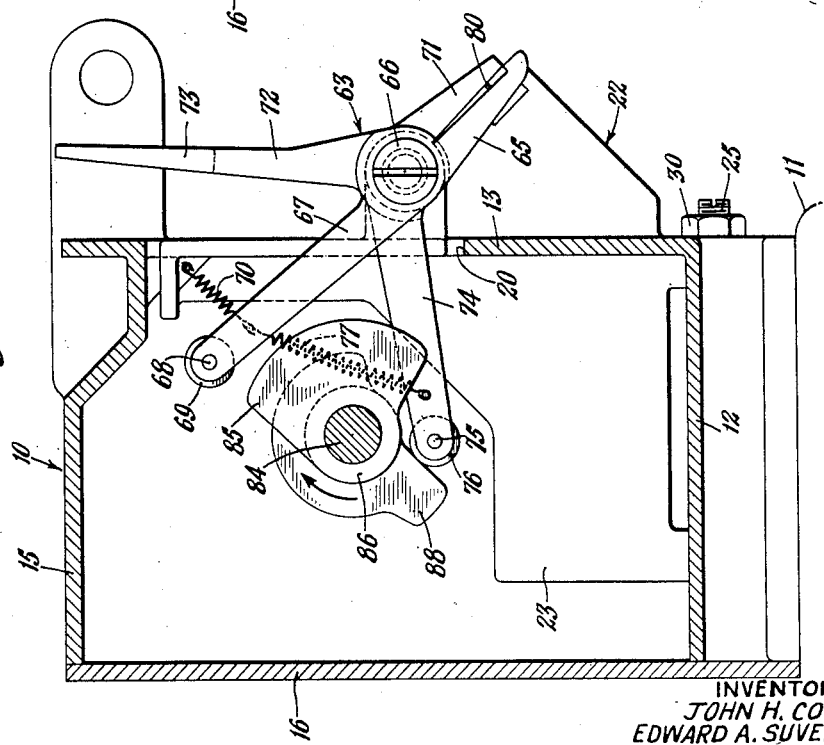

UNITED STATES PATENT OFFICE 2,627,009

METHOD OF AND APPARATUS FOR WELDING AND ANNEALING METAL ARTICLES

John H. Corson, Edward A. Suverkrop, and Dartrey Lewis, Trenton, N. J., assignors to John A. Roebling's Sons Company, Trenton, N. J., a corporation of New Jersey Application October 4, 1949, Serial No. 119,438

16 Claims. (Cl. 219—10)

This invention relates to the heating of metallic articles and, in one of its more specific aspects, to a method of and apparatus for the electrical butt-welding and subsequent annealing of electro-conductive articles, such as steel wires or rods.

The invention has for a primary object the provision of an improved method of and apparatus for quickly, easily and effectively welding and annealing metallic articles, such as steel rods or wires.

Another object of the invention is to provide apparatus adapted to grip and then automatically and successively weld, anneal and release steel wires, rods, or the like.

Another object of the invention resides in the provision of a balancing resistance in the annealing circuit of apparatus of the character indicated for controlling the temperature of a selected range of sizes of steel wire or the like during the annealing thereof.

It is another object of the invention to provide devices for readily and properly controlling the sequence of operation of mechanical and electrical parts of an electrical welding and annealing mechanism.

A further object of the invention resides in the provision, in apparatus of the character indicated, of automatic switching equipment for accurately controlling the duration of welding and annealing currents supplied to metallic parts in the course of welding and annealing such parts.

A still further object of the invention is to provide automatic electric butt-welding and annealing apparatus that is sturdy and compact in construction, reasonable in manufacturing and maintenance costs, and capable of performing its intended functions in an efficient and trouble-free manner.

To the end that the foregoing objects may be readily attained, apparatus constructed in accordance with the invention preferably comprises a support or housing having a carriage pivotally connected thereto. The carriage carries a first welding clamp and a first annealing clamp. A second welding clamp and a second annealing clamp are mounted on the support. The annealing clamps are pivotally connected to the carriage and to the support, respectively, and all clamps include a pair of normally closed jaws. The carriage, together with the first annealing clamp and the first welding clamp, is normally urged about its pivotal connection with the housing toward the second welding clamp and the second annealing clamp. The first clamps and the second clamps are adapted, respectively, to grip a corresponding metallic article, such as a steel wire or rod, between their jaws and support the articles in end abutting relation.

The articles are adapted to be heated to welding temperature by means of a welding current transmitted through an electrical circuit, including the welding clamps and the articles. The articles, subsequent to welding, are adapted to be annealed in the region of the weld by an electric current transmitted through an annealing circuit that includes the annealing clamps and the articles. The welding and annealing circuits have parts in common, including certain elements of a suitable transformer that comprises a primary coil in series in the welding circuit, a primary coil in series with the annealing circuit, and a secondary coil that is common to both circuits.

The current supplied to the articles during annealing is adapted to adjust itself automatically for wire size through the medium of a loading resistance in series with the annealing circuit. The value of the loading resistance is such as to maintain substantially the same annealing temperature in wires handled by the apparatus, irrespective of the size of the wires, within the size range adapted to be handled by the apparatus. As is well known, if the resistance is too small, relatively small wires are cooler than relatively larger wires during annealing; and, if the resistance is too large, relatively smaller wires become hotter than relatively larger wires. The temperature to be attained in the wires is determined by properly balancing the heat supplied thereto and the heat lost. The heat supplied is proportional to the product of the square of the current supplied and the resistance of the wire. The heat loss is proportional to the surface or the diameter of the wire. If, for example, the wire diameter is doubled, the heat loss will also be doubled. Moreover, the resistance of the wire will be reduced to a quarter, and if the loading resistance is low, the current supplied is almost four times as great. The loading resistance should be of such a value that the change in current which occurs with a change in wire size just compensates for the change in heat loss so that the wire temperature remains substantially constant.

A low speed synchronous motor is mounted to one side of the housing and is adapted to drive a rotary cam shaft, at a pre-selected speed, preferably two revolutions per minute. Affixed to the cam shaft and rotatable therewith is a series of cams. These cams are all made of a suitable electrical insulating material and are so formed and arranged as to successively actuate or control movement of the jaws of the various clamps, the carriage, and switches in the motor circuit, the welding circuit and the annealing circuit, as will be described in detail further along herein.

In practicing the method of the invention, a pair of steel wires or the like, to be welded and subsequently annealed in the region of the weld, are arranged so that an end portion of one of the wires is gripped between the jaws of a first welding clamp and a first annealing clamp, and an end portion of the other wire is gripped between the jaws of the second welding clamp and the second annealing clamp, with the ends of the wires disposed in abutting relation. The abutting end portions of the wires are heated sufficiently by an electric welding current transmitted thereto through the welding clamps to effect proper welding. The first clamps and wire are moved by the carriage toward the second clamps and wire while the ends of the wires are in a plastic and/or molten state during the welding step. The welding current is discontinued upon predetermined movement of the first clamps and wire toward the second clamps and wire. The weld is allowed to cool for an appropriate predetermined time so that on reheating for annealing the weld and adjacent wires attain approximately the same annealing temperature. The jaws of the welding clamps are then opened and the annealing clamps and the welded articles are moved out of contact with the jaws of the welding clamps. The articles are next heated by an annealing current transmitted through the annealing clamps. After annealing, the wires are permitted to cool, whereupon the jaws of the annealing clamps are opened automatically and the welded and annealed wires are disengaged from all clamps and dropped out of the clamps by gravity.

The enumerated objects together with additional objects, as well as the advantages of this invention, will be readily understood by persons skilled in the art, on reference to the following detailed description taken in conjunction with the annexed drawings that respectively describe and illustrate apparatus embodying a preferred arrangement of devices for practicing the invention.

In the drawings:

Fig. 1 is a view in front elevation with parts broken away, illustrating apparatus constructed in accordance with the invention;

Fig. 2 is a view in enlargement taken along line 2—2 of Fig. 1;

Fig. 3 is a view taken along line 3—3 of Fig. 2;

Fig. 4 is a view taken along line 4—4 of Fig. 2;

Fig. 5 is a view taken along staggered line 5—5 of Fig. 2;

Fig. 6 is a view taken along line 6—6 of Fig. 2;

Figure 7:
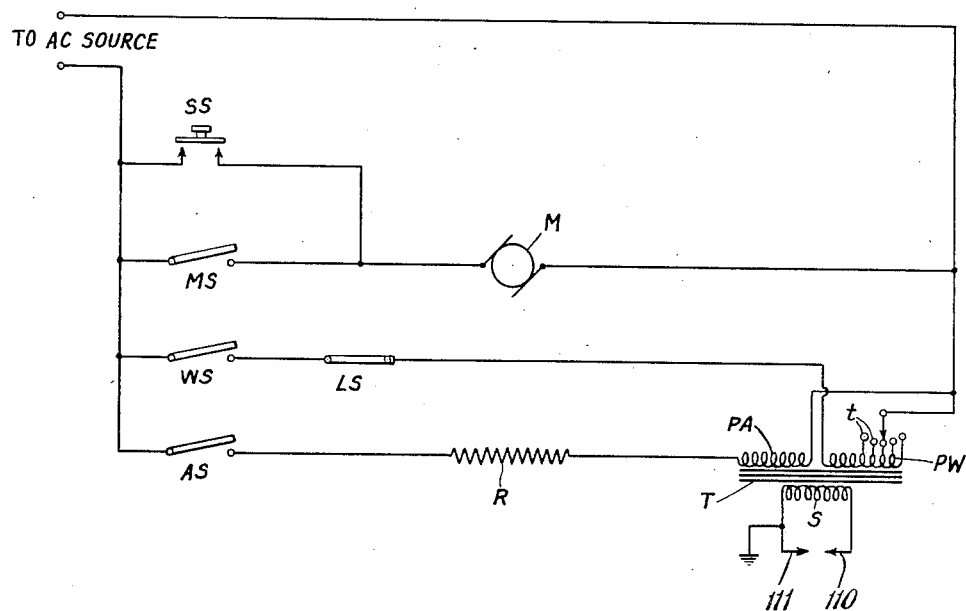
Fig. 7 illustrates diagrammatically electrical circuits adapted to be employed with this invention.
Figure 8:
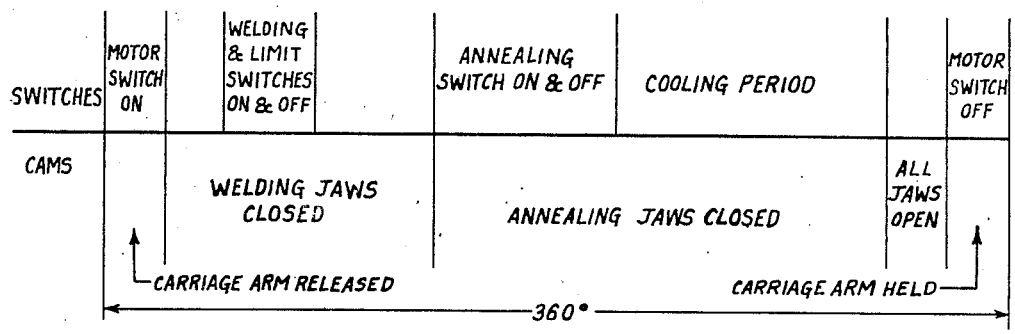
Fig. 8 indicates the relative positions of various switches in the electrical circuits, the cams and the carriage and clamp jaws, during each complete revolution of the cam shaft.

Referring now to the drawings wherein like reference characters indicate corresponding parts throughout the several views and more particularly to Figs. 1 and 2, we have illustrated therein a housing 10 mounted on a suitable stand, or the like, 11. The housing comprises a base or bottom wall 12, a front wall 13, side walls 14, a top wall 15 and a removable rear wall 16. Base 12 is provided with recesses 17 and 18, best shown in Figs. 1 and 3, while front wall 13 has a pair of openings 20 and 21 (Figs. 1 and 2).

A carriage generally indicated by numeral 22 comprises a body 23 having a pair of spaced apart legs 24 that project into recesses 17 and 18, respectively. Each leg 24 carries a pivot screw 25 (Fig. 3). The screws are coaxial and each is formed with a conical inner end 26 that registers with a corresponding end opening 27 in a bushing 28 which is made of a suitable electrical insulating material. Each pivot screw 25 is maintained in the illustrated position by a nut 30. A helical spring 32, stressed in tension, is connected at one end to a lateral extension 33 carried by carriage body 23 and is connected at its opposite end to an adjusting screw 34 that is mounted in a side wall 14 and is retained in adjusted position by a nut 35. Spring 32 normally and yieldingly urges the carriage in a clockwise direction about the common axis of pivot screws 25, as viewed in Fig. 1. A switch actuating screw 36 is carried by and is adjustable with respect to carriage 22 and is maintained in desired adjusted position with respect to the carriage by a nut 37. Screw 36 is adapted to trip a welding limit switch LS upon predetermined pivotal movement of the carriage in a clockwise direction, as viewed in Fig. 1.

A member 40 (Figs. 2 and 3) cooperates with devices that will be described further along to control the extent of pivotal movement of the carriage about the axis of screws 25. This member comprises an outer screw portion 41, an intermediate right cylindrical portion 42 that registers with a bore 43 in body 22, and an eccentric pin portion 44 that projects into the interior of the housing. Member 40 is provided with a nut 45 for maintaining the same in the desired adjusted position with respect to the carriage.

The illustrated embodiment of the invention includes a pair of spaced apart welding clamps generally designated by numerals 46 and 47, respectively. Clamp 46, as best shown in Fig. 3, comprises an insert 50 mounted in carriage body 23 and constituting the lower clamp jaw. The upper face of jaw 50 is inclined and serrated as shown in Figs. 2 and 3. Clamp 46 also comprises an upper clamp jaw 52 that is freely pivotal about a stud 53 which is supported by the carriage body. Integral with upper jaw 52 are an upstanding actuating lever 54 having a finger plate 55 at its upper end, and an arm 56 that projects laterally into the interior of the housing. A pin 57 is attached to the inner end of arm 56 and supports a freely rotatable roller 58. A helical spring 60 is secured at its opposite ends to arm 56 and carriage body 23. This spring normally urges arm 56 and therefore upper jaw 52 in a clockwise direction about the axis of stud 53, as viewed in Fig. 3, to normally and yieldingly urge jaw 52 toward jaw 50. Jaw 52 may be readily moved in a reverse direction, that is, to open position with respect to jaw 50, against the action of spring 60 by finger pressure applied to plate 55, whereby jaw 52 is moved in a counter-clockwise direction about stud 53, as viewed in Fig. 3.

As is best shown in Fig. 4, most of the parts of clamp 47 are identical with corresponding parts of clamp 46. Insert or lower clamping jaw 50 of clamp 47 is supported in a lug 61 that is integral with and projects forwardly of housing front wall 13 and that carries a corresponding stud 53. Finger plate 62 of clamp 47 extends in a direction opposite to that of finger plate 55 of clamp 46.

The apparatus of this invention includes a pair of annealing clamps 63 and 64 that will next be described. Each annealing clamp comprises a lower jaw 65, freely pivotal about a stud 66. Jaw 65 has an integral extension or arm 67 that projects into the interior of the housing and that is provided with a pin 68 which supports a freely rotatable roller 69. A spring 70 attached at its opposite ends to arm 67 and housing front wall 13 normally urges lower jaw 65 of each clamp in a clockwise direction about the corresponding stud, as viewed in Figs. 5 and 6. Each clamp 63 and 64 also includes an upper jaw 71 that is likewise pivotal with respect to its stud 66. Each upper jaw 71 has an integral upstanding actuating lever 72 and an integral inwardly projecting arm 74. Lever 72 of clamp 63 terminates in a finger plate 73. A pin 75 is secured to the inner end of arm 74 and carries a freely rotatable roller 76. A helical spring 77 connected to arms 67 and 74 normally urges the jaws of each annealing clamp into closed position.

Stud 66 of clamp 63 is carried by carriage 22, while stud 66 of clamp 64 is supported in a lug 78 that is integral with and projects forwardly of housing front wall 13. Clamp 64 includes a finger plate 79 that projects in a direction opposite to that of finger plate 73 of clamp 63.

The welding and annealing clamps are so arranged that their jaws are in substantial alignment. A pair of metallic articles, such as steel wires 80 and 81, are adapted to be readily welded together and then annealed by the apparatus of this invention. As illustrated in Figs. 1 and 2, an end portion of wire 80 is gripped between the jaws of annealing clamp 63 and welding clamp 46, while an end portion of wire 81 is gripped between the jaws of welding clamp 47 and annealing clamp 64. These wires are so positioned in the corresponding clamps that they abut as indicated at 83. The wires may be readily and quickly disposed in the illustrated position by depressing the finger plates of the corresponding clamps to open the jaws thereof, inserting the wires between the jaws and releasing the finger plates whereupon the jaws of the clamps are allowed to grasp the wires.

An electric motor that is preferably of the low speed synchronous type is mounted against side wall 14 of the housing. This motor is adapted to drive a rotary cam shaft 84, positioned within the housing and journaled in the walls thereof, at a pre-selected speed, preferably two revolutions per minute.

Mounted on the cam shaft and rotatable therewith is a plurality of cams for actuating and/or controlling movement of various clamp jaws and carriage 22. These cams will now be identified having reference particularly to Figures 2 to 6. In this connection there is provided a pair of lower annealing jaw cams 85, each of which is adapted to engage roller 69 of a corresponding annealing clamp lower jaw 65 and is integral with a hub 86 that is secured to the cam shaft by a set screw 87; a pair of upper annealing jaw cams 88, each of which engages a roller 76 of a corresponding annealing clamp upper jaw 71 and is integral with a hub 89 that is secured to the cam shaft by a set screw 90; a pair of welding jaw cams 91 each of which engages roller 58 of a corresponding welding clamp upper jaw 52 and is integral with a common hub 92 that is secured to the cam shaft by a set screw 93; and a carriage cam 94 that engages eccentric pin 44 of member 40 and is integral with a hub 95 that is secured to the cam shaft by a set screw 96.

Also mounted on cam shaft 84 and rotatable therewith is a plurality of switch cams, including a motor switch cam 97 formed with a hub 98 that is secured to the cam shaft by a set screw 99; a welding switch cam 100 formed with a hub 101 that is secured to the cam shaft by a set screw 102; and an annealing switch cam 103 formed with a hub 104 that is secured to the cam shaft by a set screw 105. Depending from the under face of housing top wall 15 is a plurality of inverted U-shaped brackets 106. One of the brackets supports a motor micro-switch MS (Fig. 6) having a tripping element 107 that engages motor switch cam 97; another bracket 106 supports a welding micro-switch WS (Fig. 3) having a tripping element 108 that engages welding switch cam 100; and a third bracket 106 supports an annealing micro-switch AS (Fig. 4) having a tripping element 109 that engages annealing switch cam 103.

Reference is next had to Figure 7 which illustrates diagrammatically preferred electrical circuits employed with the invention. It will be observed that certain parts of each circuit are common to all other circuits shown in this figure and that all circuits are adapted to be connected to a single source of alternating current supply. The apparatus is adapted to be initially placed in the service by actuating a starting switch SS that is preferably of the spring-pressed push button type and that is mounted for purposes of convenience in housing side wall 14 remote from motor M (Fig. 1). All of the switches are normally open with the exception of welding limit switch LS that is normally closed.

The illustrated arrangement includes a transformer T comprising a pair of primary coils, consisting of a welding circuit primary coil PW having a series of taps t and an annealing circuit primary coil PA, and a secondary coil S having terminals 110 and 111. Terminal 110 is connected by series leads 112 and 113 (Fig. 1) to carriage 22 while terminal 111 is connected to housing 10 in any desired manner known to the art. Interposed between annealing switch AS and primary coil PA is a loading resistance R of the character described earlier herein.

Figure 7 shows three circuits, namely a motor circuit comprising starting switch SS, motor switch MS and motor M; a welding circuit comprising welding switch WS, welding limit switch LS, primary coil PW and secondary coil S; and an annealing circuit comprising an annealing switch AS, loading resistance R, primary coil PA and secondary coil S.

For the purpose of outlining the mode of operation of the illustrated embodiment of the invention, it is assumed that the parts are in the relative position shown in the drawings and that wires 80 and 81 have been placed between the jaws of the welding and annealing clamps, as illustrated and described, so that their ends abut as indicated at 83 in Figs. 1 and 2. With the parts so arranged starting switch SS, motor switch MS, welding switch WS and annealing switch AS are all open and the motor circuit, the welding circuit and the annealing circuit are out of service.

To place the apparatus in active service, the operator merely presses and then releases starting switch SS, whereupon the apparatus operates automatically to successively weld the wires together, anneal the wires in the region of the weld, and then release the welded and annealed wires permitting them to drop out of the clamps by gravity by virtue of the inclined position of the lower jaws of corresponding clamps. Upon pressing the starting switch SS, motor M is energized thereby imparting rotation to cam shaft 84. Initial rotation of the cam shaft and motor switch cam 97 closes motor switch MS so that upon release of starting switch SS the motor continues to operate until the cam shaft makes one complete revolution at which time motor switch cam 97 trips element 107 of motor switch MS to place that switch in open position.

During each complete revolution of the cam shaft, the various cams mounted thereon successively coact with other parts in the following order. Carriage cam 94 releases eccentric pin 44 permitting carriage 22 to be urged in a clockwise direction as viewed in Fig. 1 due to the action of spring 32. Welding switch cam 100 (Fig. 3) thereupon trips element 108 to close welding switch WS thereby closing the welding circuit. Current transmitted by the welding circuit heats the abutting ends of the wires until they are soft enough to be welded and upset by the pressure exerted by the carriage under the influence of spring 32. Upon predetermined clock-wise movement of the carriage as viewed in Fig. 1, screw 36 trips limit switch LS to open position thereby interrupting the welding current supplied to the wires. Welding jaw cams 91 then move both welding clamp jaws 52 in a counter-clock-wise direction, as viewed in Fig. 4, against the action of springs 60 to place these jaws out of engagement with the wires.

Both annealing clamps with the wires gripped therebetween are pivoted about their studs 66 by cam 88 to dispose the wires substantially midway between and out of contact with the jaws of the welding clamps. Immediately thereafter annealing switch cam 103 trips element 109 of annealing switch AS (Fig. 4) thereby closing that switch and completing the annealing circuit whereupon the wires are annealed in the region of the previously formed weld. The annealing switch cam maintains switch AS in closed position for a predetermined interval of time and then permits that switch to open thereby interrupting the annealing current supplied to the wires. The annealing jaws remain closed for an interval of time following annealing to permit cooling of the wires whereupon the annealing cams 85 and 88 spread jaws 65 and 71 apart against the action of spring 77 thereby releasing the welded and annealed wires and permitting them to drop out of the apparatus by gravity. The cam shaft and the cams then return to the relative position shown in the drawings and motor switch cam 97 reopens motor switch MS placing the apparatus out of service.

From the foregoing, it is believed that the method and apparatus for practicing my instant invention will be readily comprehended by persons skilled in the art. It is to be clearly understood, however, that various changes in the apparatus herewith shown and described and in the method of practicing the invention, outlined above, may be resorted to without departing from the spirit of the invention as defined by the appended claims.

We claim:

1. In apparatus of the character described, a support, a pair of welding clamps carried by the support, a pair of annealing clamps pivotally mounted on the support, each clamp including a pair of jaws, resilient means normally urging the jaws of each annealing clamp to closed position, each welding clamp and a corresponding annealing clamp being adapted to grip a metallic article, such as a steel wire, between the jaws thereof whereby the articles are disposed in end abutting relation, means for opening the jaws of the welding clamps, and means for moving the annealing clamps about their pivotal connections with the support to a position whereby the articles are placed out of contact with the open jaws of the welding clamps.

2. In apparatus of the character described, a support, a pair of welding clamps carried by the support, a pair of annealing clamps pivotally mounted on the support, each clamp including a pair of jaws, resilient means normally urging the jaws of each annealing clamp to closed position, each welding clamp and a corresponding annealing clamp being adapted to grip a metallic article, such as a steel wire, between the jaws thereof whereby the articles are disposed in end abutting relation, a welding circuit including the welding clamps and the articles, an annealing circuit including the annealing clamps and the articles, means for opening the jaws of the welding clamps, means for moving the annealing clamps about their pivotal connection with the support to a position whereby the articles are placed out of contact with the open jaws of the welding clamps, and means including a switch for closing the annealing circuit upon movement of the annealing clamps to said position.

3. In apparatus of the character described, a support, a pair of welding clamps and a pair of annealing clamps carried by the support, each clamp including a pair of normally closed jaws, each welding clamp and a corresponding annealing clamp being adapted to grip a metallic article, such as a steel wire, between the jaws thereof whereby the articles are disposed in end abutting relation, means including a cam for opening the jaws of the welding clamps, means including a cam for moving the annealing clamps relative to the welding clamps to place the articles out of contact with the welding clamps, and means for actuating the cams in unison.

4. In apparatus of the character described, a support, a pair of welding clamps carried by the support, a pair of annealing clamps pivotally mounted on the support, each clamp including a pair of normally closed jaws, each welding clamp and a corresponding annealing clamp being adapted to grip a metallic article, such as a steel wire, between the jaws thereof whereby the articles are disposed in end abutting relation, a welding circuit including the welding clamps and the articles, an annealing circuit including the annealing clamps, a balancing resistance and the articles, means including a cam for opening the jaws of the welding clamps, means including a cam for moving the annealing clamps about their pivotal connection with the support to a position whereby the articles are placed out of contact with the open jaws of the welding clamps, means including a cam and a switch for closing the annealing circuit upon movement of the annealing clamps to said position, and means for actuating the cams in unison.

5. In apparatus of the character described, a support, a carriage movable with respect to the support, a first welding clamp and a first annealing clamp carried by the carriage, a second welding clamp and a second annealing clamp mounted on the support, resilient means for normally and yieldingly urging the carriage and the first clamps toward the second clamps, said annealing clamps being pivotally connected to the carriage and the support, respectively, each clamp including a pair of normally closed jaws, said first clamps and said second clamps being adapted, respectively, to grip a corresponding metallic article, such as a steel wire, between their jaws and support the articles in end abutting relation, means for opening the jaws of the welding clamps, and means for moving the annealing clamps about their pivotal connections to a position whereby the articles are placed out of contact with the open jaws of the welding clamps.

6. In apparatus of the character described, a support, a carriage movable with respect to the support, a first welding clamp and a first annealing clamp carried by the carriage, a second welding clamp and a second annealing clamp mounted on the support, resilient means for normally and yieldingly urging the carriage and the first clamps toward the second clamps, said annealing clamps being pivotally connected to the carriage and the support, respectively, about substantially coincident axes, each clamp including a pair of normally closed jaws, said first clamps and said second clamps being adapted, respectively, to grip a corresponding metallic article, such as a steel wire, between their jaws and support the articles in end abutting relation, a welding circuit including the welding clamps and the articles, an annealing circuit including the annealing clamps, a balancing resistance and the articles, means for opening the jaws of the welding clamps, means for moving the annealing clamps about the axes of their pivotal connections to a position whereby the articles are placed out of contact with the open jaws of the welding clamps, and means including a switch for closing the annealing circuit upon movement of the annealing clamps to said position.

7. In apparatus of the character described, a support, a carriage movable with respect to the support, a first welding clamp and a first annealing clamp carried by the carriage, a second welding clamp and a second annealing clamp mounted on the support, resilient means for normally and yieldingly urging the carriage and the first clamps toward the second clamps, each clamp including a pair of normally closed jaws, said first clamps and second clamps being adapted, respectively, to grip a corresponding metallic article, such as a steel wire, between their jaws and support the articles in end abutting relation, means including a cam for opening the jaws of the welding clamps, means including a cam for moving the annealing clamps relative to the welding clamps to place the articles out of contact with the welding clamps, and means for actuating the cams in unison.

8. In apparatus of the character described, a support, a carriage movable with respect to the support, a first welding clamp and a first annealing clamp carried by the carriage, a second welding clamp and a second annealing clamp mounted on the support, resilient means for normally and yieldingly urging the carriage and the first clamps toward the second clamps, said annealing clamps being pivotally connected to the carriage and the support, respectively, each clamp including a pair of normally closed jaws, said first clamps and said second clamps being adapted, respectively, to grip a corresponding metallic article, such as a steel wire, between their jaws and support the articles in end abutting relation, a welding circuit including the welding clamps and the articles, an annealing circuit including the annealing clamps, a balancing resistance and the articles, means including a cam for opening the jaws of the welding clamps, means including a cam for imparting pivotal movement to the annealing clamps whereby the articles are placed out of contact with the open jaws of the welding clamps, means including a cam and a switch for closing the annealing circuit upon pivotal movement of the annealing clamps to said position, and means for actuating the cams in unison.

9. In apparatus of the character described, a support, a carriage pivotally connected to the support, a first welding clamp and a first annealing clamp carried by the carriage, a second welding clamp and a second annealing clamp mounted on the support, resilient means for normally and yieldingly urging the carriage and the first clamps toward the second clamps, said annealing clamps being pivotally connected to the carriage and the support, respectively, each clamp including a pair of normally closed jaws, said first clamps and said second clamps being adapted, respectively, to grip a corresponding metallic article, such as a steel wire, between their jaws and support the articles in end abutting relation, a welding circuit including the welding clamps and the articles, an annealing circuit including the annealing clamps and the articles, means including a cam for controlling pivotal movement of the carriage with respect to the support, means including a cam for opening the jaws of the welding clamps, means including a cam for imparting pivotal movement to the annealing clamps to move the same to a position whereby the articles are placed out of contact with the open jaws of the welding clamps, means including a cam and a switch for closing the annealing circuit upon movement of the annealing clamps to said position, and a rotary cam shaft, said cams being affixed to and rotatable with the shaft.

10. In apparatus of the character described, a support, a carriage movable with respect to the support, a first welding clamp and a first annealing clamp carried by the carriage, a second welding clamp and a second annealing clamp mounted on the support, resilient means for normally and yieldingly urging the carriage and the first clamps toward the second clamps, said annealing clamps being pivotally connected to the carriage and the support, respectively, each clamp including a pair of normally closed jaws, said first clamps and said second clamps being adapted, respectively, to grip a corresponding metallic article, such as a steel wire, between their jaws and support the articles in end abutting relation, a welding circuit including a normally open first switch, a normally closed second switch, the welding clamps and the articles, an annealing circuit including the annealing clamps and the articles, means including a cam for closing the first switch, means responsive to movement of the carriage with respect to the support for opening the second switch, means including a cam for opening the jaws of the welding clamps, means including a cam for imparting pivotal movement to the annealing clamps to move the same to a position whereby the articles are placed out of contact with the open jaws of the welding clamps, means including a cam and a switch for closing the annealing circuit upon movement of the annealing clamps to said position, and a rotary cam shaft, said cams being affixed to and rotatable with the shaft.

11. In apparatus of the character described, a support, a carriage pivotally connected to the support, a first welding clamp and a first annealing clamp carried by the carriage, a second welding clamp and a second annealing clamp mounted on the support, resilient means for normally and yieldingly urging the carriage and the first clamps toward the second clamps, said annealing clamps being pivotally connected to the carriage and the support, respectively, each clamp including a pair of normally closed jaws, said first clamps and said second clamps being adapted, respectively, to grip a corresponding metallic article, such as a steel wire, between their jaws and support the articles in end abutting relation, a welding circuit including a normally open first switch, a normally closed second switch, the welding clamps and the articles, an annealing circuit including the annealing clamps, a balancing resistance and the articles, means including a cam for controlling pivotal movement of the carriage with respect to the support, means including a cam for closing the first switch, means responsive to pivotal movement of the carriage with respect to the support for opening the second switch, means including a cam for opening the jaws of the welding clamps, means including a cam for imparting pivotal movement to the annealing clamps to move the same to a position whereby the articles are placed out of contact with the open jaws of the welding clamps, means including a cam and a switch for closing the annealing circuit upon movement of the annealing clamps to said position, and a rotary cam shaft, said cams being affixed to and rotatable with the shaft.

12. The method of welding and annealing a pair of metallic articles, such as steel wires, comprising placing a first article between the jaws of a first welding clamp and a first annealing clamp, placing the other article between the jaws of a second welding clamp and a second annealing clamp so that an end thereof abuts an end of the first article, heating the abutting ends of the articles sufficiently to effect welding thereof by an electric welding current transmitted through the welding clamps, discontinuing the welding current, opening the jaws of the welding clamps while retaining the articles between the jaws of the annealing clamps, moving the annealing clamps and the articles whereby the articles are placed out of contact with the welding clamps, heating the articles in the region of the weld by an electric annealing current transmitted through the annealing clamps, and subsequently opening the jaws of the annealing clamps.

13. The method of welding and annealing a pair of metallic articles, such as steel wires, comprising placing a first article between the jaws of a first welding clamp and a first annealing clamp, placing the other article between the jaws of a second welding clamp and a second annealing clamp so that an end thereof abuts an end of the first article, heating the abutting ends of the articles sufficiently to effect welding thereof by an electric welding current transmitted through the welding clamps, discontinuing the welding current, opening the jaws of the welding clamps while retaining the articles between the jaws of the annealing clamps, moving the annealing clamps and the articles whereby the articles are placed out of contact with the welding clamps, heating the articles in the region of the weld by an electric annealing current transmitted through the annealing clamps, discontinuing the annealing current, allowing the articles to cool, and subsequently opening the jaws of the annealing clamps.

14. The method of welding and annealing a pair of metallic articles, such as steel wires, comprising placing a first article between the jaws of a first welding clamp and a first annealing clamp, placing the other article between the jaws of a second welding clamp and a second annealing clamp so that an end thereof abuts an end of the first article, said first clamps being movable in unison toward and away from the second clamps, heating the abutting ends of the articles sufficiently to effect welding thereof by an electric welding current transmitted through the welding clamps, moving the first clamps and article toward the second clamps and article while said ends are in a plastic state, discontinuing the welding current upon predetermined movement of the first clamps and article toward the second clamps and article, opening the jaws of the welding clamps while retaining the articles between the jaws of the annealing clamps, moving the annealing clamps and the articles whereby the articles are placed out of contact with the welding clamps, heating the articles in the region of the weld by an electric annealing current transmitted through the annealing clamps, and subsequently opening the jaws of the annealing clamps.

15. The method of welding and annealing a pair of metallic articles, such as steel wires, comprising placing a first article between the jaws of a first welding clamp and a first annealing clamp, placing the other article between the jaws of a second welding clamp and a second annealing clamp so that an end thereof abuts an end of the first article, said first clamps being movable in unison toward and away from the second clamps, heating the abutting ends of the articles sufficiently to effect welding thereof by an electric welding current transmitted through the welding clamps, moving the first clamps and article toward the second clamps and article while said ends are in a plastic state, discontinuing the welding current upon predetermined movement of the first clamps and article toward the second clamps and article, opening the jaws of the welding clamps while retaining the articles between the jaws of the annealing clamps, moving the annealing clamps and the articles whereby the articles are placed out of contact with the welding clamps, heating the articles in the region of the weld by an electric annealing current transmitted through the annealing clamps, discontinuing the annealing current, allowing the articles to cool, and subsequently opening the jaws of the annealing clamps.

16. The method of welding and annealing a pair of metallic articles, such as steel wires, comprising placing a first article between the jaws of a first welding clamp and a first annealing clamp, placing the other article between the jaws of a second welding clamp and a second annealing clamp so that an end thereof abuts an end of the first article, said first clamps being movable in unison toward and away from the second clamps, heating the abutting ends of the articles sufficiently to effect welding thereof by an electric welding current transmitted through the welding clamps, moving the first clamps and article toward the second clamps and article while said ends are in a plastic state, discontinuing the welding current upon predetermined movement of the first clamps and article toward the second clamps and article, opening the jaws of the welding clamps, moving the annealing clamps and the articles whereby the articles are placed out of contact with the welding clamps, heating the articles in the region of the weld by an electric annealing current transmitted through the annealing clamps, discontinuing the annealing current, allowing the articles to cool, opening the jaws of the annealing clamps whereby the welded and annealed articles are disengaged from the clamps by gravity, and then automatically moving the first clamps away from the second clamps a predetermined distance.

JOHN H. CORSON.
EDWARD A. SUVERKROP.
DARTREY LEWIS.

REFERENCES CITED

The following references are of record in the file of this patent:

UNITED STATES PATENTS

| Number | Name | Date |
|---|---|---|
| 501,546 | Thomson et al. | July 18, 1893 |
| 953,579 | Barstow | Mar. 29, 1910 |
| 2,018,379 | Pfeiffer | Oct. 22, 1935 |
| 2,018,380 | Pfeiffer | Oct. 22, 1935 |